Oct. 22, 1935.    H. F. FISHER    2,018,302
CONTINUOUS PROCESS CONTACT DEHYDRATION
Filed June 8, 1931
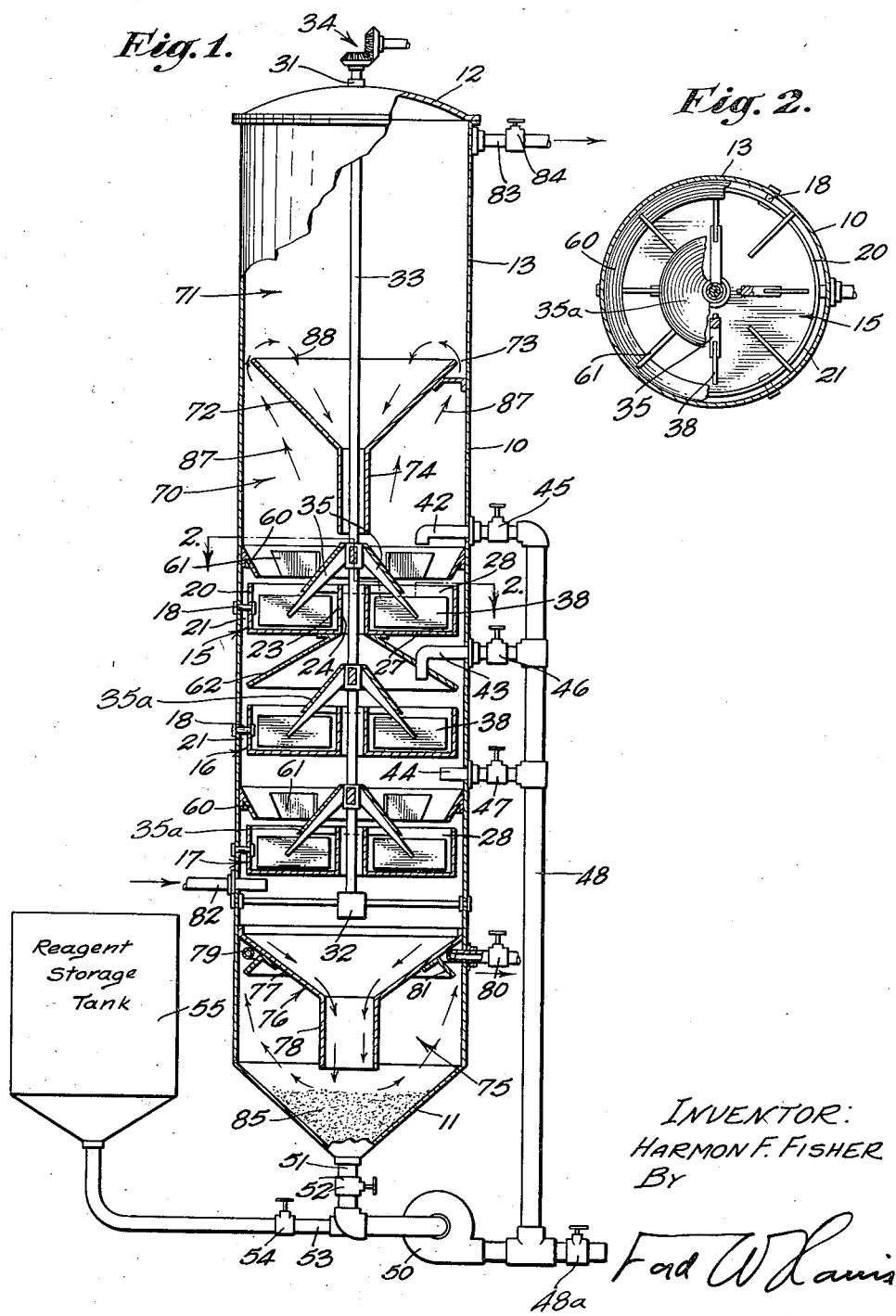
INVENTOR:
HARMON F. FISHER
BY
Fred W Lewis
ATTORNEY Patented Oct. 22, 1935

2,018,302

UNITED STATES PATENT OFFICE 2,018,302

CONTINUOUS PROCESS CONTACT DEHYDRATION

Harmon F. Fisher, Long Beach, Calif., assignor to Petroleum Rectifying Company of California, Los Angeles, Calif., a corporation of California Application June 8, 1931, Serial No. 542,997

23 Claims. (Cl. 196—3)

My invention relates to the art of breaking emulsions, and in its preferred embodiment will be particularly described as relating to a method of treating and separating into its constituent phases a petroleum emulsion.

Considering, for example, the type of petroleum emulsion usually found in the oil industry, this emulsion comprises a continuous phase of oil in which minute water droplets are suspended. While the water comprising these droplets is of greater density than the oil, the droplets do not separate from the oil even on prolonged standing in view of the presence of an emulsifying agent. Such an emulsifying agent may be formed of minute solid particles or may be partially or wholly in the form of a solution, but in either case it has been definitely ascertained that the emulsifying agent is present at the interface, and it is usually conceded that the emulsifying agent exists in the form of a minute film surrounding each water droplet. Before the water droplets can be agglomerated, it is necessary that this film be ruptured.

Certain of these emulsions are very difficult to break, for instance, the material accumulating in the bottom of oil-storage tanks, and commonly known as "tank bottoms", represents an emulsion which is extremely difficult to break by conventional methods, such as applying a high potential electric field thereto or by adding thereto chemical de-emulsifying agents sufficient to neutralize or otherwise act upon the emulsifying agent.

It is an object of this invention to provide an improved method of treating emulsions which are otherwise very difficult to treat, and the invention relates more particularly to a novel continuous method and apparatus of breaking such emulsions by the use of a mineral-contact process.

It has been found that emulsions quite difficult to break by other means may be easily separated into their constituent phases by intimately contacting the emulsion with a comminuted mineral mixture of a substance preferentially wetted by the oil phase of the emulsion and a substance preferentially wetted by the water phase of the emulsion, and it is an important object of this invention to provide a continuous process of thus contacting an emulsion with such a mineral mixture.

The apparatus herein shown is also of novel construction, and forms a part of the present invention, it being an object to provide a method and apparatus wherein the minerals are continuously introduced into and withdrawn from the treating structure.

A further object of the invention is to provide a treater having an agitating chamber, and settling means communicating therewith and into which the constituents of the emulsion flow, and wherein the minerals are separated therefrom.

Further objects of the invention lie in the constructional details of the apparatus, including the system of superimposed trays in which the desirable agitation is effected, and in a method and apparatus wherein the flow of minerals is maintained counter to the initial flow of the emulsion to be treated.

Still other objects and advantages will hereinafter be made evident to those skilled in the art.

The minerals used should be substantially insoluble in the material forming either phase of the emulsion, and are such that substantially no chemical action takes place. The treating action thus effected is a physical one rather than a chemical one, and the advantage accruing therefrom is thus a distinct saving in operating expense in view of the fact that the minerals are not used up in the process, but may be used over and over again.

The ultimate action of such a mineral mixture on the emulsion is not definitely understood, though it is fairly certain that a water-wetted material, such as silica, associates itself with the water droplets of the emulsion, and thus causes the film of emulsifying agent around each particle to stretch, as it were, to surround both the water particle and the mineral particle, thus tending to reduce the free interfacial energy of the system. The resulting droplet of water and its associated mineral particle tend to associate themselves with other minute water droplets of the emulsion, the net effect being the formation of larger droplets of sufficient size to gravitate from the oil due both to the increased size of the droplet and to the weight of the mineral matter associated therewith. Both of these tendencies thus act to cause a rapid settling of the water particles.

The particles of the substance preferentially wetted by oil are usually individually surrounded by a film of oil, and in contacting with the water droplets have a desirable action in increasing the action of the water-wetted particles when the mass is agitated. The particular manner in which such oil-wetted particles increase the action of the water-wetted particles, or vice versa, cannot be readily analyzed. It is certain, however, that the water-wetted and oil-wetted substances have a conjunctive action on the emulsion when agitated therewith which is quite different from, and far superior to, the action taking place if the emulsion is agitated with either of the substances alone. This is definitely ascertained from a knowledge of the fact that while it may be impossible to break the emulsion by agitation with either substance alone, as usually it is impossible to break an emulsion by a successive agitation with each, still an agitation of the emulsion with a mineral mixture of the two substances effects a very rapid and satisfactory treatment.

Numerous minerals may be used in the process to provide the preferentially water-wetted substance of the mineral mixture. Quartz or other silicates are very effective, and calcite, fluorspar, etc. are also quite desirable. Other materials known to the art as having the characteristics of being preferentially wetted by water rather than by oil may also be used provided these materials are substantially insoluble in the emulsion and have no material chemical action thereon. Silica forms possibly the most desirable of these materials, both because of its availability and excellent action, and in the subsequent description I will describe the process as utilizing silica as a preferentially water-wetted material of the mineral mixture, it being understood that this selection is not made for the purpose of limiting myself thereto.

The preferentially oil-wetted substance, on the other hand, may be any one of a number of materials known to the art as having the characteristic of being preferentially wetted by oil rather than water, such, for instance, as the sulfides of the heavy metals, magnetite, galena, etc. Iron pyrites, for example, form a very excellent oil-wetted substance. In the subsequent description, the oil-wetted substance will be termed a sulfide, though it is at once apparent that other substances having the desirable characteristics might be utilized.

The degree of fineness of the minerals is not critical, though it is usually preferable to use these minerals in as finely divided a form as practicable, as the finer particles apparently give more rapid action. It is entirely possible to successfully use minerals which are from 80 to 200 mesh, very satisfactory action being obtained if the mineral particles are approximately 150 mesh.

The relative amounts of these water-wetted and oil-wetted substances are not critical, and while they may be used in equal parts it is usually desirable to utilize less of the oil-wettable material. Invariable proportions cannot be given which are applicable to all types of emulsions in view of the fact that most advantageous results accrue from using a proportion particularly effective with the emulsion undergoing treatment.

The invention is not limited to the use of minerals which exist naturally in the form used in the process, for preferentially oil-wetted and preferentially water-wetted substances can be artificially prepared by synthetic methods. In other instances the preferentially oil-wetted and preferentially water-wetted characteristics of any given substance can be increased by subjecting the natural minerals or synthetic product to an auxiliary treatment to increase their preferential wettabilities.

Illustrating one apparatus in which my continuous process can be carried out,

Fig. 1 is a vertical sectional view of the apparatus.

Fig. 2 is a sectional view taken on the line 2—2 of Fig. 1.

Referring particularly to these figures, the treating unit comprises a tank 10 including a conical bottom 11 and a cover 12 which close the opposite ends of a vertically disposed shell 13.

Positioned in the central portion of the tank 10 is a plurality of trays, three of these trays being shown, and numbered respectively 15, 16, and 17, mounted one above the other, each tray being secured in place by any suitable means such as brackets 18.

Each of these trays is, in the preferred form, formed with an outer wall 20 which is smaller in diameter than the shell 13 so as to provide an annular space 21 therebetween. In addition each tray is provided with an inner wall 23 of cylindrical shape and defines a central opening 24. The outer and inner walls 20 and 23 are connected together by, or formed integrally with, a bottom wall or member 27, these walls cooperating in defining an annular chamber 28 which is filled to overflowing with minerals and emulsion as will be hereinafter brought out. It is preferable to make the outer and inner walls 20 and 23 of the same height so that any overflow of material from the annular chamber 28 will simultaneously take place through the central opening 24 and the annular space 21 when the fluid mass is not in rotational motion because of the rotation of rabble plates 38, to be hereinafter described, though this construction may be changed if desired so that one of the walls 20 or 23 may be lower than the other.

Extending centrally in the tank 10, and rotatably mounted in bearings 31 and 32, is a shaft 33 which is slowly rotated by any suitable means such as a gear system 34 shown in Fig. 1. This shaft extends through the central openings 24 of each tray, but is of smaller diameter than these openings so as to provide a passage therearound through which the minerals may drop or through which the ascending oil may be drawn from the tray below it. A plurality of rabble arms 35 are mounted on the shaft 33 above each tray and extend downward into the annular chambers 28 thereof. These rabble arms are preferably provided with blades or plates 38 which turn in the annular chambers 28 so as to agitate the mineral mass and the emulsion in these annular chambers to effect an intimate contact therebetween.

A cone shaped shroud 35a, closed at the top and open at the bottom, covers the rabble arms 35. When the shaft 33, together with the rabble arms 35 and the blades 38, are revolved slowly, there results a definite pumping action similar to that found in a rotating centrifugal pump rotor, and which causes a definite withdrawal of oil from the tray below, up through the central opening 24 and under the shroud 35a and thence radially outward through the annular chamber 28. Since the hydraulic head will be greater near the outer periphery of the chamber 28, most of the excess accumulated water-mineral mixture will overflow into the outer annular space 21, thence downward to the tray below, being guided by an apron 60. The excess treated oil discharged from the annular chamber 28 is drawn upward to the tray above, being guided by a converging apron 62, communicating with the central opening 24.

The mineral mixture may be supplied only to the uppermost tray 15, overflowing from this tray into and through the trays therebelow, but it is preferable to provide a mineral inlet means for each tray, controlling the amount of minerals in any suitable way. In Fig. 1, I have shown such a mineral supply means as comprising pipes 42, 43, and 44 extending into the tank and respectively supplying the mineral mixture to the trays 15, 16, and 17, in amount controlled by the setting of valves 45, 46, and 47. This mineral mixture is supplied from a manifold pipe 48 which extends to the discharge end of a suitable pump 50, the intake end of this pump communicating with the bottom of the tank 10 through a pipe 51 and valve 52, and also communicating with a pipe 53 including a valve 54 and communicating with a reagent storage tank 55 containing a fresh supply of mineral mixture. The pump 50 may be of any suitable type, being only diagrammatically shown in Fig. 1, and is used for the purpose of withdrawing the mineral mixture from the lower end of the tank 10, or from the reagent storage tank 55, depending upon the respective settings of valves 52 and 54. By closing the valve 54 the minerals are withdrawn exclusively from the interior of the tank 10, while if it is desired to introduce a fresh supply of the minerals into the tank 10, this may be done by first closing the valve 52 and then opening the valve 54.

In order to guide the mineral mixture from one tray into another as it moves downward in the tank 10, one or more aprons 60, previously mentioned, may be provided, each apron preferably including radial blades 61 which prevent rotation of the liquid mass therebetween, allowing all of the agitation and rotation to take place between the lower end of these blades and the bottom of the tray therebeneath. Two of these aprons are shown in Fig. 1, one being positioned above the tray 17 and the other being positioned above the tray 15, the latter also serving to guide into this tray any mineral mixture separating in the space thereabove, as will be hereinafter described. In addition, the space between the trays 15 and 16 may, if desired, be provided with the upward converging conical apron 62 rather than an apron formed as indicated by the numeral 60. As shown in Fig. 1, the apron 62 may be secured to the tray 15 and extended downward to a point above the outer wall 20 of the tray 16 therebelow so as to define an annular space immediately inside the shell 13. The function of the apron 62 is to act as a gradually converging intake communicating with the central opening 24 as previously described.

The central portion of the tank 10, in which portion the trays are positioned, comprises an agitating chamber 70. The upper end of the tank 10 forms an upper separating means in the form of an upper settling chamber 71. A conduit means 72 tends to separate the chambers 70 and 71, this conduit means being in the form of a funnel, the upper end of which is spaced from the shell 13 to define an annular space 73, and a spout 74 of which surrounds and is spaced from the shaft 33.

Similarly, the lower end of the tank 10 defines a lower separating means in the form of a lower settling chamber 75, the chambers 70 and 75 being separated by a conduit means 76 which is also preferably in the form of a funnel and providing a frusto-conical wall 77 attached to the shell 13 and terminating in a spout 78. The annular space between the shell 13 and the wall 77 serves to entrap the water phase of the emulsion which is withdrawn therefrom through a suitable means such as an annular perforated pipe 79 providing a valve 80 controlling the flow therethrough. A baffle 81 is preferably positioned below the annular pipe 79, as best shown in Fig. 1.

The emulsion to be treated may be introduced into the agitating chamber at any desired point, but it is usually preferable to introduce this emulsion through a pipe 82 positioned below the tray 17, and under sufficient pressure to overcome the hydrostatic head due to the height of the treater and also assisted by the pumping action of the blades or plates 38 in each of the three trays in overcoming the frictional head, so that an upward progressive circulation of the emulsion takes place from tray to tray in the tank 10, this flow of emulsion being counted to the mineral flow. It should be understood, however, that I am not necessarily limited to this particular point of introduction.

The operation of the apparatus shown in Fig. 1 is as follows:

The preferentially oil-wetted and preferentially water-wetted materials are preferably intimately intermixed prior to their introduction into the reagent storage tank 55. So also it is preferable to preliminarily wet these substances respectively with oil and water, so that when the valve 52 is closed, and the valve 54 opened, the pump 50 will force a preliminary charge of the mineral mixture into the trays 15, 16, and 17 in such quantities that these trays are partially filled, any overflow of the fluid-mineral mixture dropping to the lower end of the tank and forming a mineral mass 85. It is preferable to fill the lower portion of the tank above the mineral mass 85 with water, this being conveniently done by introducing the water through the pipe 82 until the lower settling chamber 75 is substantially filled. It is also preferable in starting up to fill the upper end of the agitating chamber 70, and the upper settling chamber 71 with dry oil. The shaft 33 is then set into rotation, and emulsion is slowly supplied through the pipe 82 under pressure, a portion of the dry oil being allowed to flow from the upper settling chamber 71 through the pipe 83 so that the emulsion moves upward through the central openings 24.

The emulsion thus eventually moves into the annular chambers 28 of the trays and is therein gently agitated through the action of the blades 38 and rabble arms 35, thus providing the agitation which is found to be quite essential to the process both from the standpoint of intimately mixing the emulsion and the mineral mixture and also from the standpoint of mechanically stretching or otherwise weakening or disrupting the films of emulsifying agent around each water droplet, thereby facilitating the association of the minerals with the water droplets.

An almost immediate agglomeration of the water droplets takes place, and these droplets tend to move downward in the tank, along with the excess supply of minerals overflowing the trays into the outer annular space 21. The oil, on the other hand, tends to rise through the gently agitated mass and to carry therewith a certain amount of the oil-wetted material, flowing upward around the conduit means 72, as indicated by arrows 87, and into the upper settling chamber 71. In this quiet chamber the heavier oil-wetted materials tend to separate from the oil and drop into the conduit means 72, as indicated by the arrow 88, flowing downward and being again delivered either to the upper tray 15 or flowing downward through the outer annular opening 21 to the trays therebelow. The dry oil rises to the upper end of the upper settling chamber 71 and is withdrawn therefrom through the pipe 83 provided with a valve 84.

During this operation the pump 50 either continuously or intermittently, as desired, draws the mineral mixture from the lower portion of the tank 10 and moves it upward and into the trays, thereby supplying an excess of mineral mixture to these trays and creating the desirable circulation of mineral matter in the agitating chamber. The pump 50 apparently has some cleaning action on the minerals, improving their qualities and permitting a better action by the re-use of these minerals than would otherwise be obtained.

The minerals, as they move downward in the tank, and especially the silica particles, carry the water downward therewith, and are guided by the frusto-conical wall 77 into the spout 78 whence they are introduced into the lower settling chamber 75 below the water level therein. In this chamber the minerals tend to separate and settle to the mineral mass 85, while the water is slowly withdrawn through the annular pipe 79, as determined by the setting of the valve 80.

After repeated re-use of the minerals, these minerals may be conveniently removed from the tank 10 by opening the valve 48a after closing valves 45, 46, and 47 and a new supply provided. It has been found, however, that by careful manipulation the minerals can be repeatedly reused for a large number of times.

While I have shown mechanical agitation as being employed in the treater shown in Fig. 1, it should be understood that various other types of agitation well-known in the art are possible, and thus fall within the scope of this invention. So also, while I have disclosed a counter flow of emulsion and mineral matter the invention is not necessarily limited to this detail. If the emulsion is introduced at a point above the position of the pipe 82 shown in Fig. 1, this counter flow can be eliminated.

So also, the treater can be operated in a manner as to not effect an ultimate separation of the phases in the tank 10. For instance, by maintaining the valve 80 closed, and supplying emulsion under pressure to the agitating chamber, it is possible to withdraw the agglomerated constituents of the emulsion from the tank through the pipe 83, and finally separate the constituents of the emulsion and any minerals which may be carried therewith by the use of any well-known separating means such as a settling tank, for instance.

I claim as my invention:

1. A continuous mineral-contact process of breaking emulsions of oil and water, which includes the steps of: continuously introducing and withdrawing a mineral mixture into and from a chamber at such rates as to maintain a substantially constant quantity of said mixture therein, said mixture comprising a mixture of a finely divided substance preferentially wetted by water and a finely divided substance preferably wetted by oil; continuously bringing a stream of emulsion into the vicinity of said mineral mixture; agitating said emulsion and said mineral mixture whereby the equilibrium of said emulsion is upset to resolve the emulsion into its component phases of oil and water; and continuously removing said oil and water from said chamber.

2. A continuous mineral-contact process of breaking emulsions of oil and water, which includes the steps of: introducing a stream of a mineral mixture into an agitating chamber, said mineral mixture comprising a substance preferentially wetted by water and a substance preferentially wetted by oil, said substances being substantially insoluble in oil and water; continuously introducing a stream of the emulsion into said agitating chamber; gently agitating said mineral mixture and said emulsion in said agitating chamber to upset the equilibrium of said emulsion; and separating said mineral mixture, said oil and said water.

3. A continuous mineral-contact process of breaking emulsions of oil and water, which includes the steps of: continuously introducing a stream of a mineral mixture into one portion of an agitating chamber, said mineral mixture comprising a substance preferentially wetted by water and a substance preferentially wetted by oil, said substances being substantially insoluble in oil and water; continuously introducing a stream of the emulsion into said agitating chamber; gently agitating said mineral mixture and said emulsion in said agitating chamber to upset the equilibrium of said emulsion; continuously withdrawing said mineral mixture from another portion of said agitating chamber; recycling this mineral mixture into said first-named portion of said agitating chamber; and separating said oil from said water.

4. A continuous mineral-contact process of breaking emulsions of oil and water, which includes the steps of: flowing a stream of a mineral mixture through an agitating chamber in a given direction, said mineral mixture comprising a mixture of a substance preferentially wetted by oil and a substance preferentially wetted by water, said substances being substantially insoluble in oil and water; introducing into said agitating chamber a counter-flow of said emulsion; agitating said mineral mixture and said emulsion in said agitating chamber whereby said mineral mixture upsets the equilibrium of said emulsion to such an extent that separation of said oil and water can take place; and separating the mineral matter, said oil and said water.

5. A continuous mineral-contact process of breaking emulsions of oil and water by the use of a relatively high chamber, which method includes the steps of: maintaining in the central portion of said chamber a mineral mixture of a material preferentially wetted by water and a material preferentially wetted by oil; moving a stream of said emulsion upward through said mineral mixture, said substances being substantially insoluble in water and oil; agitating said mineral mixture and said emulsion in said central portion of said chamber to such an extent that said oil and said water separate; removing said oil from the top of said chamber; and removing said water from the bottom of said chamber.

6. A process as set forth in claim 5, which includes: continuously introducing said mineral mixture into said central portion of said chamber to compensate for any of said mineral mixture which is carried by said water and oil; removing from said water and said oil any of said mineral mixture carried thereby; and re-introducing into said central portion of said chamber mineral matter thus separated.

7. In a mineral-contact treater, the combination of: a tank; means for simultaneously introducing into and withdrawing from said tank a mineral mixture; means for introducing the emulsion to be treated into said tank; means for agitating said emulsion and said mineral mixture in said tank; and means for separately withdrawing the separated phases of said emulsion from the upper and lower ends of said tank.

8. In a mineral-contact treater, the combination of: a tank; means for supporting a mineral mixture in said tank; means for introducing the emulsion to be treated into said tank; means for agitating said emulsion and said mixture to disrupt the equilibrium thereof whereby the phases of said emulsion separate in said tank; means for withdrawing one of said phases of said emulsion from said tank at a point above said mineral mixture; and means for withdrawing the other of said phases from said tank at a point below said mineral mixture.

9. In a mineral-contact treater, the combination of: a tank; a plurality of trays positioned in said tank; means for supplying a mineral mixture to the uppermost of said trays in such quantities that said mineral mixture successively overflows said uppermost tray and the trays therebelow; means for introducing the emulsion to be treated into said tank; means for agitating said emulsion with said mineral mixture; and means for withdrawing said mineral mixture and the constituents of said emulsion from said tank.

10. In a mineral-contact treater, the combination of: a tank; a plurality of trays positioned in said tank; means for supplying a mineral mixture to the uppermost of said trays in such quantities that said mineral mixture successively overflows said uppermost tray and the trays therebelow; means below said trays for introducing the emulsion to be treated into said tank; means for agitating said emulsion with said mineral mixture; and means for withdrawing said mineral mixture and the constituents of said emulsion from said tank.

11. In a mineral-contact treater, the combination of: a tank; a plurality of trays positioned in said tank; means for supplying a mineral mixture to the uppermost of said trays in such quantities that said mineral mixture successively overflows said uppermost tray and the trays therebelow; means for introducing the emulsion to be treated into said tank; a shaft mounted to rotate in said tank; rabble means on said shaft adjacent each tray and extending thereinto to agitate the mineral mixture and the emulsion therein; and means for withdrawing said mineral mixture and the constituents of said emulsion from said tank.

12. In a mineral-contact treater, the combination of: a tank; means defining an upper and a lower settling chamber respectively at the upper and lower ends of said tank; means for introducing a mineral mixture into the central portion of said tank and between said settling chambers; means for introducing the emulsion to be treated into said central portion of said tank; agitating means for agitating said mineral mixture and said emulsion in said central portion whereby the phases of said emulsion tend to separate, the lighter phase rising to said upper settling chamber and being therein separated from any of said minerals carried upward therewith, and the heavier phase dropping to said lower settling chamber and being therein separated from any of said minerals associated therewith; and means for withdrawing said phases from said settling chambers.

13. A combination as defined in claim 12 in which said first-named means comprises upper and lower conduit means communicating with said central portion of said tank and communicating respectively with said upper and lower settling chambers.

14. In a mineral-contact treater, the combination of: a tank; a plurality of trays in said tank, each tray comprising an outer wall spaced from said tank to define an annular space, an inner wall defining a central opening, and a bottom wall connecting said inner and outer walls; means for introducing a mineral mixture into the uppermost of said trays, said mineral mixture dropping successively to the trays therebelow when each tray becomes full to overflowing; means for supplying an emulsion to said trays; and means for agitating said mineral mixture and said emulsion in said trays.

15. In a mineral-contact treater, the combination of: a tank; a plurality of trays in said tank, each tray comprising an outer wall spaced from said tank to define an annular space, an inner wall defining a central opening, and a bottom wall connecting said inner and outer walls; means for introducing a mineral mixture into the uppermost of said trays, said mineral mixture dropping successively to the trays therebelow when each tray becomes full to overflowing; and means for moving the emulsion to be treated upward successively through the trays in said tank and into intimate contact with said mineral mixture.

16. A combination as defined in claim 14 including aprons extending inward from said tank above said trays to guide said mineral mixture overflowing said outer wall of the tray above into the tray immediately therebeneath.

17. In a mineral-contact treater, the combination of: a tank; supply means for supplying a mineral mixture to the interior of said tank; pump means for withdrawing said mineral mixture from another level of said tank and returning it to said supply means; means for introducing a fresh supply of said mineral mixture to said pump means to be circulated through said tank along with the used mineral mixture; and means for mixing the mineral mixture in said tank with the emulsion to be treated.

18. In a mineral-contact treater, the combination of: walls defining an agitating chamber; means for continuously delivering a mineral mixture to said agitating chamber and removing a substantially identical amount of mineral mixture therefrom; means for continuously introducing a stream of the emulsion to be treated into said agitating chamber; and agitating means for agitating said mineral mixture and said emulsion in said agitating chamber to bring about intimate contact between the emulsion and said mineral mixture to effect a coalescence of the dispersed phase of the emulsion, the emulsion constituents moving from said agitating chamber along with the minerals of said mineral mixture.

19. In a mineral-contact treater, the combination of: a tank; walls defining an agitating chamber in said tank, the space inside said tank exclusive of said agitating chamber defining a settling zone in open communication with said agitating chamber; means for continuously delivering a mineral mixture to said agitating chamber, a corresponding amount of mineral mixture flowing from said agitating chamber and into said settling zone whereby a substantially constant amount of said mineral mixture is retained in said agitating chamber; means for continuously delivering the emulsion to be treated to said agitating chamber, said emulsion flowing from said agitating chamber and into said settling zone where separation of said mineral mixture and the constituents of said emulsion takes place; and means for agitating said mineral mixture and said emulsion in said agitating chamber to effect intimate contact between said mineral mixture and said emulsion.

20. A combination as defined in claim 19 including a discharge pipe means communicating with the lower portion of said settling zone and through which the separated mineral mixture moves, and in which said means for continuously delivering said mineral mixture to said agitating chamber includes an intake pipe means communicating with said agitating chamber and a pump means for again moving into said intake pipe means the mineral mixture discharged from said settling zone through said discharge pipe means.

21. In a mineral-contact treater, the combination of: a tank; a downward-sloping baffle extending partially across said tank to define a settling chamber in said tank beneath said baffle, said baffle providing a central opening communicating with the space above said settling chamber; means for continuously delivering a mineral mixture to the space above said settling chamber; means for continuously delivering the emulsion to be treated to said space; means in said space for agitating said mineral mixture and said emulsion to bring about an intimate contact therebetween, said mineral mixture and the heavier constituent of said emulsion settling onto said downward-sloping baffle and flowing downward therealong and into said settling chamber wherein said heavier constituent of said emulsion and said mineral mixture separate; means for withdrawing said mineral mixture from the bottom of said settling chamber; and means for removing said heavier constituent of said emulsion from the upper portion of said settling chamber.

22. A continuous mineral-contact process of breaking an emulsion of oil and water, which method includes the steps of: continuously introducing into an agitating chamber a mineral mixture comprising a substance preferentially wetted by water and a substance preferentially wetted by oil, said substances being substantially insoluble in oil and water; continuously introducing into said agitating chamber a stream of the emulsion to be treated; agitating said emulsion and said mineral mixture in said agitating chamber to bring about intimate contact therebetween; separating said mineral mixture and the constituents of said emulsion by settling; and maintaining said mineral mixture in contact with water during the settling thereof.

23. In a mineral-contact treater, the combination of: walls defining an agitating chamber including a plurality of baffles therein, said agitating chamber containing a mineral mixture comprising a substance preferentially wetted by water and a substance preferentially wetted by oil, said substances being substantially insoluble in water and oil; means for introducing an emulsion of oil and water into said agitating chamber; means for moving said baffles to move said mineral mixture from one elevation in said tank to another, said minerals during this movement falling through said emulsion undergoing treatment to come into intimate contact therewith to break said emulsion; and means for removing the treated constituents of said emulsion from said agitating chamber.

HARMON F. FISHER.

CERTIFICATE OF CORRECTION.

Patent No. 2,018,302.

October 22, 1935.

HARMON F. FISHER.

It is hereby certified that error appears in the printed specification of the above numbered patent requiring correction as follows: Page 4, second column, line 52, claim 5, before the semicolon insert the comma and words , said materials being substantially insoluble in water and oil; and lines 54 and 55, of said claim, strike out the comma and words , said substances being substantially insoluble in water and oil; and that the said Letters Patent should be read with these corrections therein that the same may conform to the record of the case in the Patent Office.

Signed and sealed this 26th day of November, A. D. 1935.

(Seal)

Leslie Frazer
Acting Commissioner of Patents.